(12) United States Patent
Ettl et al.

(10) Patent No.: US 8,494,885 B2
(45) Date of Patent: Jul. 23, 2013

(54) MODELING DISTRIBUTION OF EMERGENCY RELIEF SUPPLIES FOR DISASTER RESPONSE OPERATIONS

(75) Inventors: Markus Ettl, Yorktown Heights, NY (US); Soumyadip Ghosh, Yorktown Heights, NY (US); Young M. Lee, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 12/576,919

(22) Filed: Oct. 9, 2009

(65) Prior Publication Data

US 2011/0087514 A1   Apr. 14, 2011

(51) Int. Cl.
*G06Q 30/00* (2006.01)

(52) U.S. Cl.
USPC ............. 705/7; 705/8; 705/9; 705/10; 705/28

(58) Field of Classification Search
USPC ......................................... 705/7, 8, 9, 10, 28
See application file for complete search history.

(56) References Cited

U.S. PATENT DOCUMENTS

| | | | | |
|---|---|---|---|---|
| 2002/0143669 | A1* | 10/2002 | Scheer | 705/28 |
| 2005/0197876 | A1* | 9/2005 | Benda et al. | 705/7 |
| 2008/0172280 | A1* | 7/2008 | Goulimis | 705/8 |
| 2008/0183599 | A1* | 7/2008 | Hill et al. | 705/28 |
| 2008/0294484 | A1* | 11/2008 | Furman et al. | 705/8 |
| 2011/0270646 | A1* | 11/2011 | Prasanna et al. | 705/7.27 |

OTHER PUBLICATIONS

Aaby et al., Montgomery County's Public Health Service Uses Operations Research to Plan Emergency Mass Dispensing and Vaccination Clinics, Interfaces, Nov.-Dec. 2006, pp. 569-579, vol. 36, No. 6.
Richter et al., Preliminary Analysis of Alternate Modes of Dispensing for LA County.
Whitworth, Designing the Response to an Anthrax Attack, Interfaces, Nov.-Dec. 2006, pp. 562-568, vol. 36, No. 6.
Lee et al., Large-Scale Dispensing for Emergency Response to Bioterrorism and Infectious-Disease Outbreak, Interfaces, Nov.-Dec. 2006, pp. 591-607, vol. 36, No. 6.
Miller et al., Responding to Bioterrorist Smallpox in San Antonio, Interfaces, Nov.-Dec. 2006, pp. 580-590, vol. 36, No. 6.
Kim et al., On the Asymptotic Validity of Fully Sequential Selection Procedures for Steady-State Simulation, Operations Research, 2006, 475-488, 54.

* cited by examiner

*Primary Examiner* — Nga B. Nguyen
(74) *Attorney, Agent, or Firm* — Scully, Scott, Murphy & Presser, P.C.; Daniel P. Morris, Esq.

(57) ABSTRACT

A method and system to supply multiple items through a network of inventory staging areas and distribution points by determining inventory stocking levels for a staging area and distribution points, and inventory shipments from said staging area to distribution points and between the distribution points, using an optimization formulation whose objective is to cover maximum overall demand at the distribution points in a given period of time, and to minimize total cost of meeting demand.

20 Claims, 4 Drawing Sheets

MODELING DISTRIBUTION OF EMERGENCY RELIEF SUPPLIES FOR DISASTER RESPONSE OPERATIONS

BACKGROUND

The present disclosure relates generally to distributing supplies, and more particularly to modeling distribution of emergency relief supplies for disaster operations. When disasters occur (e.g., such as hurricane, earthquake, fire, bioterrorism, and others), emergency supplies (e.g., water, meal, medicine, generators, blankets, tarps, and others) need to be distributed to victims on time. The distribution operations in those situations (e.g., supply chain and dispensing) are unique because the operations need to cover a large number of people (e.g., million of victims) in a short period of time (e.g., a small number of hours or days) under undesirable conditions for supply chain operation (chaos, damaged and/or congested roadways, behavior of victims, progression of disasters, many unknowns and uncertainties), and serious consequences of an ineffective distribution plan (sickness, social disorder, and others). It is usually a one time event of short duration with limited opportunity for re-planning the supply chain design.

Relief distribution supply chain operations differ from typical industrial supply chains. Unlike standard stationary demand distribution assumptions, relief operations need to take into account a huge surge in demand within short notice. Unfavorable logistical conditions for supply chain operations such as chaotic traffic, damaged/congested roadways and chaotic behavior of demand (victims) have to be explicitly considered. Additionally, lead time requirements are short. Preparing for a large disaster such as hurricane is difficult primarily because of the high uncertainty involved in predicting where and when it will strike. Therefore, operational research models to improve preparedness for and response to major emergencies would be desirable.

A typical distribution for relief supplies starts from a central warehousing or like, to a staging area from where the supplies are distributed to individual point of distribution (POD) locations. Persons needing the supplies collect them from the POD locations. In most disaster situations, demand from victims exhibits high uncertainty and variability. Disaster relief supplies may reach different POD locations at different speed and with different quantities, creating an imbalance between the supply and demand. For example, certain PODs may experience shortage of supplies and certain other POD location may experience surplus during disaster response operations. Thus, it is desirable that each POD location has the correct amount for distribution to the demand at that location.

BRIEF SUMMARY OF THE INVENTION

A system and method for supplying multiple items through a network of inventory staging areas and distribution points are provided. The system, in one aspect, may include a processor and an analytic engine that is operable and executable on the processor. The analytic engine is operable to determine inventory stocking levels at a staging area and distribution points, and inventory shipments between said staging area and distribution points and between the distribution points, using an optimization formulation whose objective is to cover maximum overall demand at the distribution points in a given period of time. The objective function of the optimization formulation may also include minimizing total cost of meeting the demand.

A method for supplying multiple items through a network of inventory staging areas and distribution points, in one aspect, may include determining inventory stocking levels at a staging area and distribution points, and inventory shipments between said staging area and distribution points and between the distribution points, using an optimization formulation whose objective is to cover maximum overall demand at the distribution points in a given period of time. The objective function of the optimization formulation may also include minimizing total cost of meeting the demand.

A program storage device readable by a machine, tangibly embodying a program of instructions executable by the machine to perform one or more methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

In one aspect, a Brownian Motion (BM) model is disclosed for the relief supply demand to adequately capture the non-stationary, volatility and correlation inherent in it. A tool is presented in one embodiment of the present disclosure, which guides the relief operations based on continually updating the operational plan by solving a sequence of stochastic optimization problems. The model may be used to effectively distribute supply coming into a staging area in the disaster-hit area to local points of distribution (POD), and also cross-level or cross-distribute among PODs, e.g., to attain the quick coverage of the affected populace and/or areas.

In one aspect, an optimization model is defined that attempts to find the best allocation of the incoming supply at the staging area to the PODs that maximizes the objective of an agency or the like responding to disaster situations. The optimization model also allows for re-balancing of inventory between PODs through cross-shipping. In one aspect, and unlike traditional logistics of a typical supply chain, the optimization goal in the model of the present disclosure focuses on the ability to quickly cover the population demanding relief at the PODs.

Figure 1:
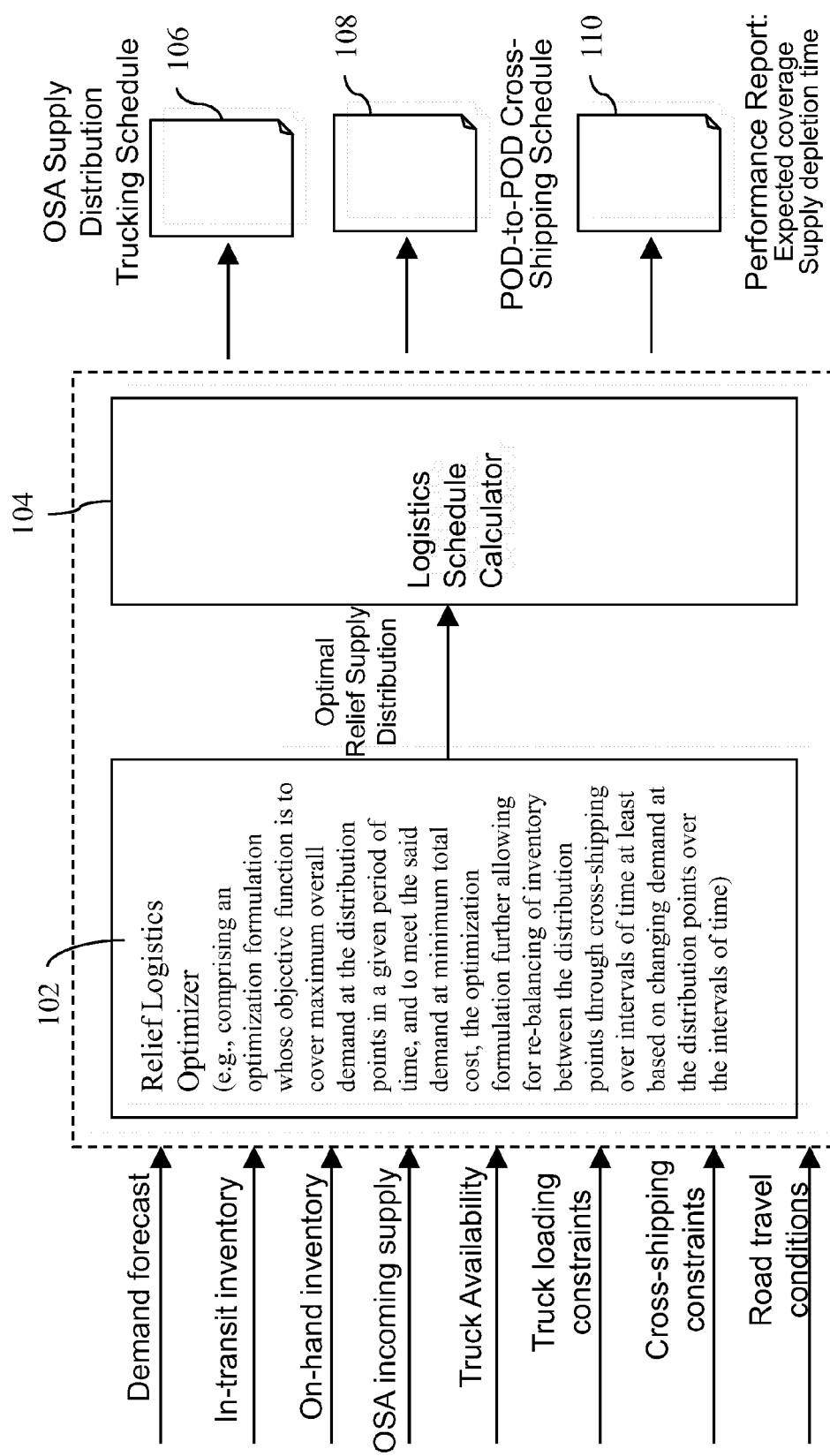
FIG. 1 is a block diagram illustrating a supply distribution and cross shipping modeler of the present disclosure.

FIG. 1 is a block diagram illustrating a supply distribution and cross shipping modeler of the present disclosure. A relief logistics optimizer 102 uses input such as demand forecast, in-transit inventory, on-hand inventory, staging area incoming supply, truck availability (or other transportation medium availability), truck loading constraints (or other transportation medium loading constraints), cross-shipping constraints, and road travel conditions. The relief logistics optimizer 102 employs a formulation to output relief supply distribution from the staging area such as the local staging area (LSA) to different PODs, and between different PODs. Example formulations of the optimizer 102 are explained further below. Logistics schedule calculator 104 converts the output to logistics schedule, which may include supply distribution schedule from the staging area to different POD locations 106 and cross-shipping schedule from a POD to another POD. The logistics schedule calculator 104 may also generate a report of the distribution, for example, that details expected coverage, supply depletion time, and other performance information.

Figure 2:
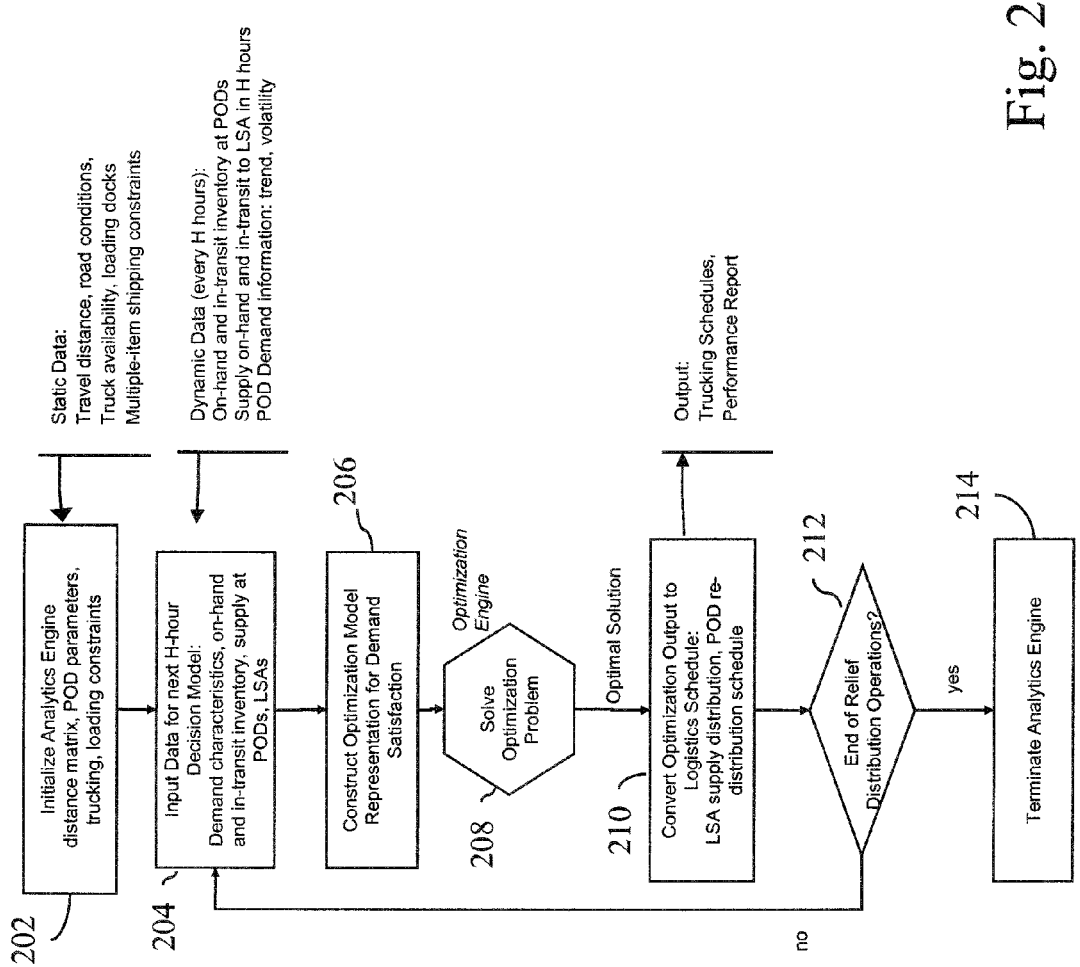
FIG. 2 illustrates a method of determining supply distribution and cross shipping based in one embodiment of the present disclosure.

FIG. 2 illustrates a method of determining supply distribution and cross shipping in one embodiment of the present disclosure. At 202, an optimization model (also referred to herein interchangeable as an optimization engine or analytics engine), is initialized. Initialization may include setting up a distance matrix, POD parameters, truck (or other vehicle) availability and loading constraints using input data such as the travel distance, road conditions, vehicle availability, availability of one or more loading docks, multiple-item shipping constraints, and others. The data may be input by a user or read from available files as an input to the model or combinations of both.

At 204, dynamic data, that is the information that changes as the disaster happens and relief is demanded, is received. The data may include, but is not limited to, demand characteristics, i.e., number of persons needing or requesting the supplies at each POD, on-hand and in-transit inventory at each POD and staging area, and others. In one embodiment, the dynamic data collected at 204 applies to a periodic interval, e.g., next H hours. Thus, in one embodiment, the decision that the model addresses may evolve over time as the both the supply and demand may change over time. Supply (or inventory) at a local staging area (LSA) is being brought in from central warehouses located elsewhere outside the affected zone. Demand evolves over time starting with the time of impact of the disaster; typically, the demand starts very high at the beginning of operations and tapers off.

At 206, an optimization model representation of the supply delivery problem is constructed. The model can consider either a deterministic or a stochastic model of demand evolution. In one aspect, the decisions that the stochastic optimization formulation address may include: 1) what should be the re-stocking level at each POD, and 2) how should these re-stocking levels be attained. The latter question may be answered by a combination of shipments of supply either present or coming into the LSA that are diverted to the PODs, and of cross-balancing shipments made between PODs to help those that are facing imminent shortfall from those that have a comfortable level of inventory. The decision process of the present disclosure is simplified by formulating optimization problems with a significantly shorter horizon (e.g., hours) than the entire relief operations (days), and cyclically updating decisions by re-solving with a pre-determined frequency. The optimization problem in each cycle will determine the best set of decisions that maximizes customer (demand) coverage over all PODs given the total inventory available over H hours. The model and (greedy) objective of each cycle is formulated in a manner that obtains solutions close to global (in the time-scale sense) optimality. The detailed algorithm for the optimization model is explained further below.

At 208, optimization problem is solved using the constructed model. At 210, the optimization solution is converted into schedules and reports. For instance, the optimization model or formulation may output inventory amounts to ship from LSA to one or more PODs and from one POD to another POD, that satisfies the constraints of the optimization model. Those output values may be converted or formatted into actionable transportation schedules that implement the determined shipment, and reports that summarize the current and expected performance of the supply delivery system, identify potential supply shortcomings, etc.

At 212, if the relief distribution operation has ended, the analytic engine stops, otherwise, the steps 204-210 repeat for the next interval period.

The optimization formulation is now explained in more detail. In the following description, trucks are referred to as the medium for transporting supplies as example. It should be understood, however, that the present disclosure does not limit transportation vehicles to only trucks; rather other medium may be utilized for transporting the supplies. The cycle-horizon H is fixed to be of the order of the average time it takes for a truck (or another transportation medium) to make a round-trip between LSA and the PODs. Thus, the limitation on the number of available trucks becomes a natural constraint on the maximum shipments allowed in each horizon. Standard inventory theory dynamics are assumed for this discretized model: each POD starts with a specific inventory-at-hand $I^i$ and a customer-queue $Q^i$, any shipments due at the POD arrives at the beginning, the demand for the timeslot is realized over time, and service is provided continuously throughout the slot. The constrained service delivery rate is a restriction faced by relief operations in practice and is explicitly addressed in the model. We model this using a maximum service rate $S^i$. Service is conservative, i.e., continues at maximum rate without delay as long as any inventory is available. A finite limited service rate implies that both inventory-at-hand $I^i$ and customer-queue (back-orders) $Q^i$ can be non-zero, and also lets us relate the inventory and queue lengths over the horizon given the inventory distribution decisions. The optimal decision formulation then determines on the best allocation of the total inventory available to the system amongst the PODs. Call $I^{LSA}$ the total available (current and expected over H hours) inventory at the LSA. In addition the inventories $I^i$ at the POD i can also be re-distributed. Let $R^i$ represent the change in inventory at POD i as a result of our distribution decisions. Note that $R^i$ can be negative, representing cross-shipments of inventory from POD i. For the ease of modeling the servicing dynamics of each POD, we assume that this re-distribution is instantaneous. This is reasonable given the limit on the throughput $S^i<\infty$, and the anticipation that in most instances of this problem $I^i>0$ to start with. The optimization objective in one embodiment, however, may use the length of delivery to penalize cross-shipments across large distances.

The logistical constraints that need to be placed on the distribution variable R' are now described.

Logistical Constraints

Total received replenishment $R^i$ comes from either LSA or other PODs via redistributions.

Define a set of variables $R^{ij}_{CS}$ for each i≠j, each representing the total cross-shipment received at POD j from POD i. Let $R^i_{LSA}$ represent the amount of LSA's inventory available currently or over the next H hours that is shipped to POD i. Balancing $R^i$ with the $R^{ij}_{CS}$ and $R^i_{LSA}$, we have $$\forall\, i,\ R^i = R^i_{LSA} + \sum_{j|j\ne i} (R^{ji}_{CS} - R^{ij}_{CS}) \qquad (1)$$

The optimal solution is penalized to ensure it picks only one of $R^{ij}_{CS}$ or $R^{ji}_{CS}$ to be non-zero. Additional trucking constraints may apply to the LSA and POD to POD cross-shipments. A typical truckload for LSA shipment may be a full 18-wheeler with a total capacity of $TC_{LSA}$ KiloLitres, where typically $TC_{LSA}=16$. Further, it may be that only full truckloads are mobilized in order to minimize the number of large trucks on the already-fragile road infrastructure. Define N(H) to be the total full truckloads of inventory (supply) available at the LSA over the next H hours. Define for each POD i an integer-valued variable $x^i_{LSA}$ representing the number of truckloads sent from LSA to POD i. These variables satisfy $$\sum_i x^i_{LSA} \leq N(H) \quad (2)$$

$$R^i_{LSA} = x^i_{LSA} TC, \quad \forall i$$

$$x^i_{LSA} \in \{0, 1, 2, \ldots, N(H)\} \quad \forall i.$$

The N(H) itself accounts for the limited trucks available in the next H hours for LSA logistics operations.

For the cross-shipment part, both the truck-size and the number of trucks available may constrain the total cross shipments. Define $NT_{CS}$ to be the total cross-shipping trucks available. These are typically smaller than 18-wheelers, and their carrying capacity TCCS is a fraction of the LSA load $TC_{LSA}$. Additionally, POD inventories may be held in the pallets they came in from the LSA, and thus cross-shipment loads may be multiples of a standard pallet size $P_{CS}$. For each POD i define integer-valued variables $y^{ij}_{CS}$ and $x^{ij}_{CS}$ where the first represents the number of pallets cross-shipped from POD i to j, and the second represents the number of trucks needed to carry this load. The following constraints round out the cross-shipment model:

$$R^{ij}_{CS} = y^{ij}_{CS} P_{CS} \quad \forall i, j, i \neq j \quad (3)$$

$$y^{ij}_{CS} P_{CS} \leq x^{ij}_{CS} TC_{CS} \quad \forall i, j, i \neq j$$

$$\sum_{i,j|i\neq j} x^{ij}_{CS} \leq NT_{CS}$$

$$y^{ij}_{CS} \in \{0, 1, 2, \ldots, \lfloor TC_{CS}/P_{CS} \rfloor NT_{CS}\} \quad \forall i, j, i \neq j$$

$$y^{ij}_{CS} \in \{0, 1, 2, \ldots, NT_{CS}\} \quad \forall i, j, i \neq j.$$

The following now describes two objects in one embodiment that are minimized in a balanced manner in the optimization formulations.

OBJECTIVES

In one embodiment, the goal of the formulation is to maximize the overall coverage achieved using the supply available through the next H hours. Define for POD i the quantity $\tau^i$ to be the time to drain out $I^i+R^i$ amount of inventory starting from the current time. The drain-out time $\tau^i$ depends on 1) the amount $I^i+R^i$, 2) the servicing rate $S^i$, and 3) the demand process serviced by the POD. Call Di(t) POD i's cumulative demand by t, starting with $Q^i$ at current time t=0. Then, a good proxy for our customer-coverage maximization goal using the current inventory-at-hand may be achieved by minimizing a function of the individual $\tau^i$'s. The following two objects may be minimized:

$$\tau = \max_i \tau^i, \text{ or} \quad (4)$$

$$\tau = \sum_i w^i \tau^i. \quad (5)$$

With the first definition (4), $\tau$ stands for the time when the last of the total inventory ($I^{LSA}+\tau_i I^i$) is used up. The second objective (5) minimizes a weighed average of the individual supply depletion times $\tau^i$. This scheme of solving optimization problems sequentially can then be interpreted as one which tries to find the quickest way to dissipate short-term available supply through the given POD network.

Another objective minimizes the total cost of shipment, $$\sum_i \left\{ R^i_{LSA} t^i_{LSA} + \sum_{j|j \neq i} R^{ij}_{CS} t^{ij}_{CS} \right\}, \quad (6)$$

where $t^i_{LSA}$ is the average time it takes to truck from the LSA to POD i, and $t^{ij}_{CS}$ is the average shipping time from POD i to j. The triangle-inequality is assumed to hold for any three locations, but note that $t^{ij}_{CS}$ and $t^{ji}_{CS}$ may not coincide because of various local restrictions (one-ways, etc.) imposed on the degraded road infrastructure. These penalties ensure that only necessary shipments are considered and frivolous shipments between far-flung PODs, and cross-shipments between each pair i, j in both directions are avoided.

The two objectives may be jointly minimized, each weighed appropriately. We associate an inventory shortage cost b with the coverage objective.

Deterministic Model

Figure 3:
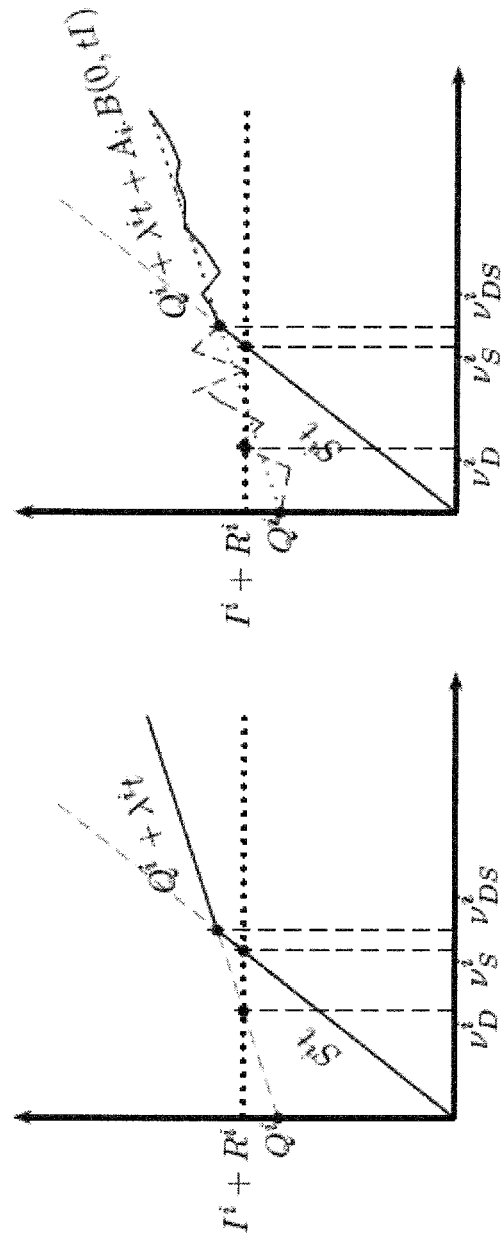
FIG. 3A plots a sample path of a POD's usage of inventory.
FIG. 3B plots a sample path of a POD's usage of inventory over time under the stochastic demand model.

FIG. 3A plots a sample path of a POD's usage of inventory. At time t=0 (current time), a backorder of $Q^i$ exists, and the total distribution to POD i is ($I^i+R^i$). The POD starts consuming inventory at the linear rate $S^i$. On the other hand, demand grows at the linear rate $\lambda^i$, and thus the total demand faced by POD i at time t is $D^i(t)=Q^i+\lambda^i t$. Let $f^i(t):=\min\{S^i t, D^i(t)\}$ be the drain-out process over time. Then, the earliest drain-out time $\tau^i$ of this POD i starting with the current distribution plan is $$\tau^i := \min\{t | f^i(t) = I^i + R^i\}.$$

Since both the service and demand functions are non-decreasing ($\lambda^i \geq 0$), so is $f^i$ and then we have the simpler $\tau^i$ definition $f(\tau^i)=I^i+R^i$. The function f is piecewise linear, and so the constraint can be reformulated as a set of linear inequalities in terms of the variables $\tau^i$ and $R^i$. Define $v^i_S$ and $v^i_D$ to be the intersection times of the service and demand curves with the inventory level $I^i+R^i$ respectively, as illustrated in FIG. 3A. The time $v^i_D=+\infty$ if the demand accumulation curve does not intersect with the inventory level, and can also be negative. The earliest drain-out time $\tau^i=\max\{0, v^i_S, v^i_D\}$.

With the objective (4) of minimizing the maximum of the POD drain-out times, a linear programming then allows us to use the following set of equivalent constraints in place of the piece-wise definition of $\tau^i$:

$$\tau^i \geq 0$$

$$\geq v^i_D = (I^i+R^i-Q^i)/\lambda^i$$

$$\geq v^i_S = (I^i+R^i)/S^i. \quad (7)$$

For any optimal solution $\{\tau^i_*, R^i_*, \forall i\}$ to the first objective (4), the POD that attains the maximum $i^*=\arg\max_i \tau^i_*$ will satisfy $\tau^{i^*}_* = \max\{0, v^{i^*}_D, v^{i^*}_S\}$. If the $\tau^i_*$ for any POD $i \neq i^*$ does not match the corresponding maxima $\{0, v^i_S, V^i_D\}$, a modified solution can be obtained by setting those value to equal the corresponding maximum value without affecting the solution cost.

When the primary objective is of form (5), a Special Ordered Set to model $\tau^i$ may be used.

In one embodiment, the complete optimization formulation for deterministic demand is:

$$\min b \cdot \tau + \sum_i \left\{ R^i_{LSA} t^i_{LSA} + \sum_{j|j \neq i} R^{ij}_{CS} t^{ij}_{CS} \right\}.$$

such that
$I^i=\text{<data>}$, $Q^i=\text{<data>}$ (initial conditions)
supply distribution $R^i$ to i as defined by (1), (2) and (3)
measure $\tau$ as defined in (4) or (5) constraints on individual $\tau^i$ of form (7).

In the above optimization formulation, represents customer satisfaction criteria, i.e., one or more decision objectives, and $$\sum_i \left\{ R^i_{LSA} t^i_{LSA} + \sum_{j|j \neq i} R^{ij}_{CS} t^{ij}_{CS} \right\}$$

represents the transportation cost from (6).

Stochastic Model for Relief Supply Demand

The demand faced by a relief delivery operation is very different from the standard supply chain models. Demand is highly non-stationary, time-dependent and volatile. We use a Brownian Motion model of the demand faced by the PODs. The cumulative demand process D(t) is a I-dimensional process that is defined in terms of its increment at time t $$dD(t) = \lambda(t) + A(t) dB(0, tI)$$

where $\lambda(\bullet)$, a I-vector, represents the time-dependent rate of change of demand, A(t) is the I×I standard deviation process, and B(0, I) is a zero-mean, uncorrelated Brownian Motion with standard deviations of one. The mean $\lambda(\bullet)$ changes with the time-of-day. One can expect it to be high during the AM hours as disaster affected families look to collect their supplies for the day, and dies down slowly over the day. This pattern broadly lasts for the duration of the relief-operations, and falls off over time as more of the affected civic infrastructure comes back up. Moreover, the affected region can be classified into bands where the effect is heavier or lighter depending on the severity of damage to the region. The standard deviation process A(t) helps capture the significant variation that might occur, for instance due to queue abandonment in favor of another nearby POD. We can also capture the significant correlation that might exist between the demand faced by close-by PODs: for example, demand fielded by adjacent PODs can be correlated because the local populace might visit multiple nearby PODs looking to obtain the quickest service.

Our cyclic decomposition approach to the decision-making process allows us to simplify the demand model slightly and assume that the mean and standard-deviation are constant over the next H hours from the current time. Thus, the demand growth faced by the stochastic optimization problem may be of the form:

$$D(t) = D(0) + \lambda t + AB(0, tI),$$

where time t=0 represents the current time, and D(0) the current demand (e.g., customer-queue). We let Q represent D(0).

Model with Stochastic Demand

FIG. 3B plots a sample path of a POD's usage of inventory over time under the stochastic demand model. The demand in this case grows stochastically as Q+D(t) where the i-th component is $$D^i(t) = Q^i + \lambda^i t + A_i \cdot B(0, tI),$$

and $A_i$ is the i-th row of the matrix A. Let $f^i(t) \triangleq \min\{S^i t, D^i(t)\}$ represent the stochastic drain-out process. The $f^i(t)$ process is a scaled and rotated standard Reflected Brownian Motion (RBM); the rotation is set by the service rate $S^i(t)$ and the correlation matrix A. Then, the earliest drain-out time $\tau^i$ of this POD i starting with the current distribution plan is the first hitting time of the stochastic RBM process $f^i$:

$$\tau^i \triangleq \min\{t | f^i(t) = I^i + R^i\}.$$

This formulation for optimization under stochastic demand may allow us to expand the expectation of the $\tau^i$ explicitly so that the final formulation solved is deterministic. This may avoid the computational penalty incurred by any solution procedure that handles stochastic formulations via scenario generation or stochastic approximations. In one embodiment, we use an approximation to $E\tau^i$, the expected value of $\tau^i$. Analogous to the deterministic case described above, define:

$$v^i_S \triangleq \min\{t : S^i_t = I^i + R^i\}$$

$$v^i_D \triangleq \min\{t : I^i + R^i = Q^i + \lambda^i t + AB(0, tI)\}$$

$$v^i_{DS} \triangleq \min\{t : S^i t = Q^i + \lambda^i t + AB(0, tI)\}.$$

The term $v^i_S$ is deterministic as in the earlier case, and has value $(I^i + R^i)/S^i$. The quantities $v^i_D$ and $v^i_{DS}$ are stochastic and by definition are stopping times associated with the demand growth $Q^i + D^i(t)$. An approximation for the earliest draining time $\tau^i$ is given by $$\tau^i = \begin{cases} v^i_D & \text{if } v^i_{DS} \leq v^i_S, \\ v^i_S & \text{otherwise} \end{cases} \quad (8)$$

and the expected value of $\tau^i$ can be calculated as $$E\tau^i = Ev^i_D P(v^i_{DS} \leq v^i_S) + v^i_S (1 - P(v^i_{DS} \leq v^i_S)). \quad (9)$$

The expected value $Ev^i_D$ is obtained by standard techniques for Brownian Motion (BM) first hitting times. The probability $P(v^i_{DS} \leq v^i_S)$ can also be calculated based on earliest exit times of Brownian Motions from wedges. V. Fabian in "*Note on Anderson's sequential procedures with triangular boundary*" (The Annals of Statistics, 2:170-176, 1974), provides an exact expression for the probability that a BM with a known drift starting from the origin exits out of a triangular region symmetrically drawn around the time-axis (i.e., the BM value 0) via the expected arm, which is the arm that lies in the direction of the drift. This result is used extensively in the ranking-and-selection approach to discrete stochastic optimization to bound the probability of correctly rejecting inferior points from the finite parameter set (see, S.-H. Kim and B. L. Nelson. "*On the asymptotic validity of fully sequential selection procedures for steady state simulation*", Operations Research, 54:475-488, 2006). Note that the expression in the equations (9) can be non-linear in the distribution variables $R^i$.

We seek to minimize a function $\tau$ of these $\tau^i$ over $i \in I$. This is their maximum if (4) is followed. The expectation of this maximum cannot however be written down readily in closed form. In another embodiment, primary objective to minimize may be chosen to be $E\tau=\Sigma^i\tau^i$ as in (5). This objective readily yields a closed form expression for all terms involved and thus provides a deterministic formulation to solve. The complete formulation with this objective would be:

$$\min b \cdot \sum_i E\tau^i + \sum_i \left\{ R^i_{LSA} t^i_{LSA} + \sum_{j|j\neq i} R^{ij}_{CS} t^{ij}_{CS} \right\}.$$

such that
$I^i=<\text{data}>$, $Q^i=<\text{data}>$ (initial conditions)
supply distribution $R^i$ to i as defined by (1), (2) and (3)
individual $E\tau^i$ is defined by equation of form (9).
In the above optimization formulation $$\sum_i E\tau^i$$

represents customer satisfaction criteria, i.e., one or more decision objectives, and $$\sum_i \left\{ R^i_{LSA} t^i_{LSA} + \sum_{j|j\neq i} R^{ij}_{CS} t^{ij}_{CS} \right\}$$

represents the transportation cost from (6).

The solution to these optimization problems determines the target set of inventory levels at each POD and a plan to redistribute inventory from the staging area and the PODs, and between PODs. This information may be then converted into a dynamically updating actionable transportation schedule where vehicles are assigned specific tasks in implementing the re-distribution targets. Schedule creation takes into consideration factors like location- and time-availability of free transportation vehicles, driver availability, and any logistical constraints on the local manpower (minimum rest period for drivers, and other factors) and facilities.

The above algorithms are described as examples only and thus the invention is not limited to using only that algorithm. Other algorithm using one or more or different combination of dynamic parameters such as those described above, may be utilized to provide cross shipping decisions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention, It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
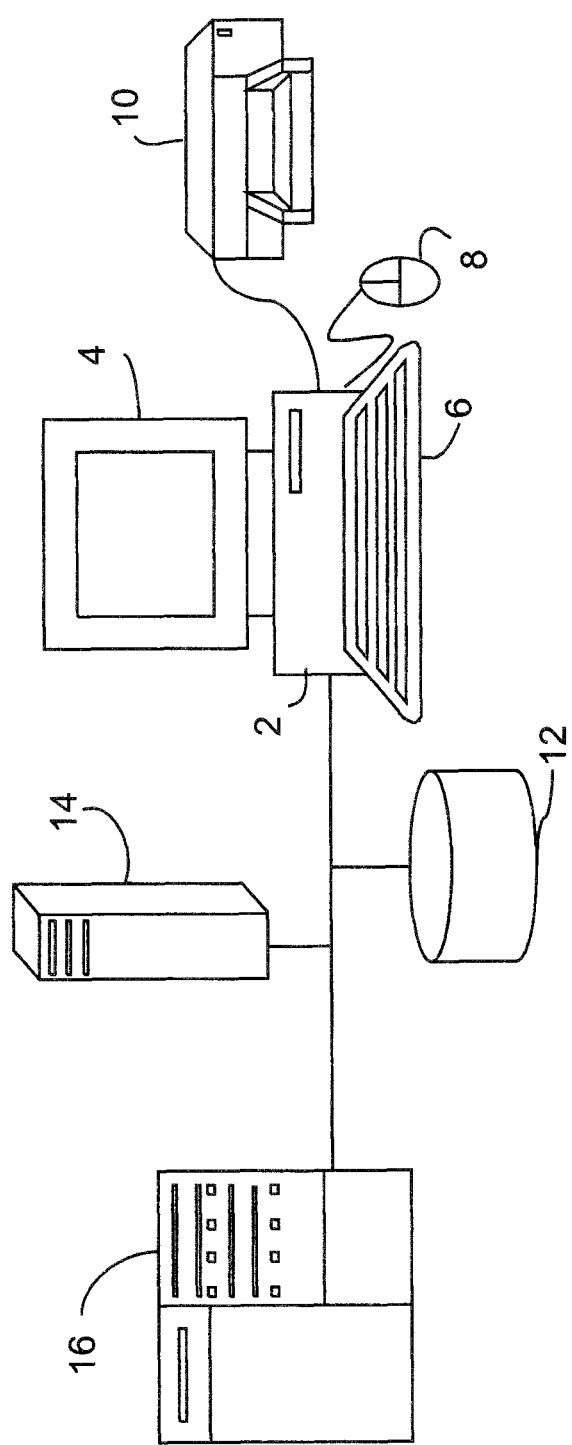
FIG. 4 illustrates an example of a computer system, in which the systems and methodologies of the present disclosure may be carried out or executed.

Referring now to FIG. 4, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 306 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for supplying multiple items through a network of inventory staging areas and distribution points, comprising:
   determining, using a processor, inventory stocking levels at a staging area and distribution points, and inventory shipments between said staging area and distribution points and between the distribution points, using an optimization formulation whose objective function is to cover maximum overall demand at the distribution points in a given period of time, and to meet the said demand at minimum total cost,
   the optimization formulation further allowing for re-balancing of inventory between the distribution points through cross-shipping over intervals of time at least based on changing demand at the distribution points over the intervals of time.

2. The method of claim 1, wherein the step of determining is performed iteratively for each given period of time using data associated with said each given period of time respectively as input to the optimization formulation, at least one of the data being dynamic data that changes over said each given period of time.

3. The method of claim 1, wherein the objective to cover maximum overall demand at the distribution points is formulated as minimizing time for distributing total inventory through the distribution points.

4. The method of claim 1, wherein the objective to cover maximum overall demand at the distribution points is formulated as minimizing a weighted average of individual supply depletion times of the distribution points.

5. The method of claim 1, wherein the optimization formulation is deterministic.

6. The method of claim 1, wherein the optimization formulation is stochastic.

7. The method of claim 1, wherein the optimization formulation includes:
   minimizing $$b \cdot \tau + \sum_i \left\{ R^i_{LSA} t^i_{LSA} + \sum_{j,j \neq i} R^{ij}_{CS} t^{ij}_{CS} \right\},$$

wherein
   b is shortage cost,
   $\tau$ is time total inventory is depleted at the distribution points,
   i, j represents i-th and j-th distribution points,
   $R^i_{LSA}$ represents amount of staging area inventory available for shipping to distribution point i,
   $t^i_{LSA}$ represents average time it takes to ship from the staging area to the distribution point i,
   $R^{ij}_{CS}$ represents amount of shipment received at distribution point j from distribution point i,
   $t^{ij}_{CS}$ represents average time it takes to ship from distribution point i to the distribution point j.

8. The method of claim 1, wherein the optimization formulation includes:
   minimizing $$b \cdot \sum_i E\tau^i + \sum_i \left\{ R^i_{LSA} t^i_{LSA} + \sum_{j,j \neq i} R^{ij}_{CS} t^{ij}_{CS} \right\},$$

wherein
   b is shortage cost, $$\sum_i E\tau^i$$

is expected time value for total inventory to be depleted at the distribution points,
   i, j represents i-th and j-th distribution points,
   $R^i_{LSA}$ represents amount of staging area inventory available for shipping to distribution point i,
   $t^i_{LSA}$ represents average time it takes to ship from the staging area to the distribution point i,
   $R^i_{CS}$ represents amount of shipment received at distribution point j from distribution point i,
   $t^i_{CS}$ represents average time it takes to ship from distribution point i to the distribution point j.

9. The method of claim 1, further including generating a schedule for distribution using output from the optimization formulation, generating a report of a schedule for distribution using output from the optimization formulation, or combinations thereof.

10. A non-transitory program storage device readable by a machine, tangibly embodying a program of instructions executable by the machine to perform a method of supplying multiple items through a network of inventory staging areas and distribution points, comprising:
    determining, by a processor, inventory stocking levels at a staging area and distribution points, and inventory distribution from said staging area and distribution points and between the distribution points, using an optimization formulation whose objective is to cover maximum overall demand at the distribution points in a given period of time, and to minimize total cost of meeting the demand,
    the optimization formulation further allowing for re-balancing of inventory between the distribution points through cross-shipping over intervals of time at least based on changing demand at the distribution points over the intervals of time.

11. The non-transitory program storage device of claim 10, wherein the step of determining is performed iteratively for each given period of time using data associated with said each given period of time respectively as input to the optimization formulation, at least one of the data being dynamic data that changes over said each given period of time.

12. The non-transitory program storage device of claim 10, wherein the objective to cover maximum overall demand at the distribution points is formulated as minimizing time for distributing total inventory through the distribution points.

13. The non-transitory program storage device of claim 10, wherein the objective to cover maximum overall demand at the distribution points is formulated as minimizing a weighted average of individual supply depletion times of the distribution points.

14. The non-transitory program storage device of claim 10, wherein the optimization formulation includes minimizing $$b \cdot \tau + \sum_i \left\{ R^i_{LSA} t^i_{LSA} + \sum_{j|j \neq i} R^{ij}_{CS} t^{ij}_{CS} \right\},$$

wherein
b is shortage cost,
τ is time total inventory is depleted at the distribution points,
i, j represents i-th and j-th distribution points,
$R_{LSA}^i$ represents amount of staging area inventory available for shipping to distribution point i,
$t_{LSA}^i$ represents average time it takes to ship from the staging area to the distribution point i,
$R_{CS}^{ij}$ represents amount of shipment received at distribution point j from distribution point i,
$t_{CS}^{ij}$ represents average time it takes to ship from distribution point i to the distribution point j.

15. The non-transitory program storage device of claim 10, wherein the optimization formulation includes minimizing $$b \cdot \sum_i E\tau^i + \sum_i \left\{ R^i_{LSA} t^i_{LSA} + \sum_{j|j \neq i} R^{ij}_{CS} t^{ij}_{CS} \right\},$$

wherein
b is shortage cost, $$\sum_i E\tau^i$$

is expected time value for total inventory to be depleted at the distribution points,
i, j represents i-th and j-th distribution points,
$R_{LSA}^i$ represents amount of staging area inventory available for shipping to distribution point i,
$t_{LSA}^i$ represents average time it takes to ship from the staging area to the distribution point i,
$R_{CS}^{ij}$ represents amount of shipment received at distribution point j from distribution point i,
$t_{CS}^{ij}$ represents average time it takes to ship from distribution point i to the distribution point j.

16. A system for supplying multiple items through a network of inventory staging areas and distribution points, comprising:
a processor;
an analytic engine operable execute on the processor and to determine inventory stocking levels at a staging area and distribution points, and inventory shipments from said staging area and distribution points and between the distribution points, using an optimization formulation whose objective is to cover maximum overall demand at the distribution points in a given period of time, and to minimize total cost of meeting demand, the optimization formulation further allowing for re-balancing of inventory between the distribution points through cross-shipping over intervals of time at least based on changing demand at the distribution points over the intervals of time.

17. The system of claim 16, wherein the analytic engine is operable to determine the inventory stocking levels iteratively for each given period of time using data associated with said each given period of time respectively as input to the optimization formulation, at least one of the data being dynamic data that changes over said each given period of time.

18. The system of claim 16, wherein the objective to cover maximum overall demand at the distribution points is formulated as minimizing time for distributing total inventory through the distribution points, or as minimizing a weighted average of individual supply depletion times of the distribution points.

19. The system of claim 16, wherein the optimization formulation includes minimizing $$b \cdot \tau + \sum_i \left\{ R^i_{LSA} t^i_{LSA} + \sum_{j|j \neq i} R^{ij}_{CS} t^{ij}_{CS} \right\},$$

wherein
b is shortage cost,
τ is time total inventory is depleted at the distribution points,
i, j represents i-th and j-th distribution points,
$R_{LSA}^i$ represents amount of staging area inventory available for shipping to distribution point i,
$t_{LSA}^i$ represents average time it takes to ship from the staging area to the distribution point i,
$R_{CS}^{ij}$ represents amount of shipment received at distribution point j from distribution point i,
$t_{CS}^{ij}$ represents average time it takes to ship from distribution point i to the distribution point j.

20. The system of claim 16, wherein the optimization formulation includes minimizing $$b \cdot \sum_i E\tau^i + \sum_i \left\{ R^i_{LSA} t^i_{LSA} + \sum_{j|j \neq i} R^{ij}_{CS} t^{ij}_{CS} \right\},$$

wherein
b is shortage cost, $$\sum_i E\tau^i$$

is expected time value for total inventory to be depleted at the distribution points,
i, j represents i-th and j-th distribution points,
$R_{LSA}^i$ represents amount of staging area inventory available for shipping to distribution point i,
$t_{LSA}^i$ represents average time it takes to ship from the staging area to the distribution point i,
$R_{CS}^{ij}$ represents amount of shipment received at distribution point j from distribution point i,
$t_{CS}^{ij}$ represents average time it takes to ship from distribution point i to the distribution point j.

* * * * *